United States Patent
Oono et al.

(10) Patent No.: US 10,483,589 B2
(45) Date of Patent: Nov. 19, 2019

(54) LITHIUM-ION SECONDARY BATTERY

(71) Applicant: Sumitomo Osaka Cement Co., Ltd, Tokyo (JP)

(72) Inventors: Kouji Oono, Tokyo (JP); Takao Kitagawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 266 days.

(21) Appl. No.: 15/279,980

(22) Filed: Sep. 29, 2016

(65) Prior Publication Data
US 2017/0237121 A1 Aug. 17, 2017

(30) Foreign Application Priority Data
Feb. 12, 2016 (JP) .................. 2016-025178

(51) Int. Cl.
*H01M 4/00* (2006.01)
*H01M 10/0567* (2010.01)
*H01M 4/36* (2006.01)
*H01M 4/58* (2010.01)
*H01M 4/587* (2010.01)
*H01M 4/62* (2006.01)
*H01M 10/0525* (2010.01)

(52) U.S. Cl.
CPC ....... *H01M 10/0567* (2013.01); *H01M 4/366* (2013.01); *H01M 4/587* (2013.01); *H01M 4/5825* (2013.01); *H01M 4/628* (2013.01); *H01M 10/0525* (2013.01)

(58) Field of Classification Search
CPC ......... H01M 10/0567; H01M 10/0525; H01M 4/366; H01M 4/5825; H01M 4/587; H01M 4/628
See application file for complete search history.

(56) References Cited

U.S. PATENT DOCUMENTS

| | | | |
|---|---|---|---|
| 2012/0237833 A1 | 9/2012 | Guerfi et al. | |
| 2016/0126549 A1 | 5/2016 | Yuge et al. | |
| 2016/0190589 A1 | 6/2016 | Oono et al. | |
| 2016/0211507 A1* | 7/2016 | Sharma | ............... H01M 4/0402 |

FOREIGN PATENT DOCUMENTS

| | | | | |
|---|---|---|---|---|
| CN | 101567447 A | 10/2009 | | |
| CN | 101901898 B | 2/2013 | | |
| JP | 2007128723 A | 5/2007 | | |
| JP | 2013504858 A | 2/2013 | | |
| JP | 2014022294 A | 2/2014 | | |
| JP | 2016126875 A | 7/2016 | | |
| WO | 2014196615 A1 | 12/2014 | | |
| WO | WO 2014/196615 | * 12/2014 | ............ H01M 4/505 | |

OTHER PUBLICATIONS

Japanese Office Action for Japanese Application No. 2016-025178 dated Aug. 9, 2016.

Search Report for European Patent Application No. 16191996.4 (dated Mar. 9, 2017).

* cited by examiner

Primary Examiner — Raymond Alejandro
(74) Attorney, Agent, or Firm — Merchant & Gould P.C.

(57) ABSTRACT

A lithium-ion secondary battery of the present invention includes a cathode including an electrode material having electrode active material particles and an oxide coat and a carbonaceous film which coat surfaces of the electrode active material particles, an anode including a carbon-based active material, and an electrolytic solution, and the electrolytic solution does not substantially include additives for stabilizing a coat formed on a surface of the anode.

13 Claims, No Drawings

LITHIUM-ION SECONDARY BATTERY

CROSS-REFERENCE TO RELATED APPLICATIONS

This application claims the benefit of Japanese Patent Application No. 2016-025178 filed Feb. 12, 2016, the disclosure of which is herein incorporated by reference in its entirety.

BACKGROUND OF THE INVENTION

Field of the Invention

The present invention relates to a lithium-ion secondary battery.

Priority is claimed on Japanese Patent Application No. 2016-025178, filed Feb. 12, 2016, the content of which is incorporated herein by reference.

Description of the Related Art

In recent years, as batteries anticipated to have a small size, be lightweight, and have a high capacity, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions such as lithium titanate ($Li_4Ti_5O_{12}$) are used. Among these, carbon-based materials are widely used due to their low reaction potential, capability of producing batteries with high voltage, that is, high energy, degree of capacityper unit mass, inexpensive price, and the like.

Carbon-based materials have a reaction potential that is close to the reductive decomposition reaction potential of ordinary electrolyte materials. Therefore, it is known that a film called a solid-electrolyte-interphase (SEI) (hereinafter, referred to as "SEI film") is generated on the surface of an active material made of a carbon-based material. These SEI films help favorable intercalation and deintercalation of lithium ions and also have an effect of suppressing deterioration of active materials. Meanwhile, a variety of chemical species such as the molecules of electrolytic solutions, ions constituting electrolyte salts, and lithium ions derived from cathodes participate in the generation of SEI films. In addition, SEI films are generated by consuming the above-described substances as raw materials in batteries.

Due to what has been described above, the initial coulombic efficiency of lithium-ion secondary batteries decreases in a case in which carbon-based materials are used for anodes, and the capacity of lithium-ion secondary batteries deteriorates due to the consumption of constituent substances accompanied by SEI films being broken down and rebuilt due to repeated charging and discharging. In order to suppress this capacity deterioration, it is effective to generate stable and rigid SEI films in the initial phase and suppress SEI films being broken down and rebuilt due to repeated charging and discharging. However, in order to suppress deterioration of the capacity of lithium-ion secondary batteries, generally, a method in which an additive represented by vinylene carbonate is added to electrolytic solutions is used (for example, refer to Japanese Laid-open Patent Publication No. 2007-128723).

The above-described breaking down of SEI films is significantly affected by constituent elements eluting into electrolytic solutions from cathode materials or impurity elements in electrolytic solutions. Therefore, it is also an effective method for suppressing deterioration of the capacity of lithium-ion secondary batteries to decrease the content of the above-described elements in electrolytic solutions so as to prevent the elements from reacting with SEI films formed on the surface of anodes.

PRIOR ART REFERENCE

Patent Document

[Patent Document 1] Japanese Unexamined Patent Application, Publication No. 2007-128723

SUMMARY OF THE INVENTION

The additive such as vinylene carbonate increases the resistance of electrolytic solutions or increases the reaction resistance of the surface of active materials (the interface of active materials with electrolytic solutions) and, furthermore, increases the resistance of lithium-ion secondary batteries, and thus there is a problem that additives hinder an increase in the output of lithium-ion secondary batteries.

The present invention has been made in consideration of the above-described circumstances and an object of the present invention is to provide a lithium-ion secondary battery which includes a cathode having excellent wettability with respect to electrolytic solutions, suppresses capacity deterioration caused by charging and discharging cycles without adding additives which may increase the resistance of electrolytic solutions, and has a high output.

As a result of intensive studies for solving the above-described problems, the present inventors and the like found that, when electrode active material particles, an organic substance which is a precursor of a carbonaceous film, and a precursor of an oxide are mixed together, and a mixture thereof is thermally treated, thereby forming an oxide coat and a carbonaceous film on the surfaces of the electrode active material particles, the oxide coat which improves wettability of electrolytic solutions is formed on the surfaces of the electrode active material particles, and thus the contact area between the electrode active material particles and electrolytic solutions can be increased, even in a thermal treatment step during the carbonization of the organic substance, it is possible to suppress the sintering and grain growth of the electrode active material particles, and electrode materials in which the surfaces of the electrode active material particles are uniformly coated with the carbonaceous film can be obtained. Furthermore, the present inventors and the like found that cathodes comprising the above-described electrode materials improve the charging and discharging cycle characteristics of lithium-ion secondary batteries for which an anode comprising a carbon material is used without using additives for stabilizing SEI films, whereby lithium-ion secondary batteries having a high output can be obtained and completed the present invention.

A lithium-ion secondary battery of the present invention comprises a cathode comprising an electrode material, the electrode material comprising electrode active material particles, and an oxide coat and a carbonaceous film which coat surfaces of the electrode active material particles; an anode comprising a carbon-based active material; and an electrolytic solution; and the electrolytic solution does not substantially include additives for stabilizing a coat formed on a surface of the anode.

According to the lithium-ion secondary battery of the present invention, since the stability of coats is improved in spite of the fact that the lithium-ion secondary battery comprises a cathode comprising an electrode material comprising electrode active material particles, and an oxide coat and a carbonaceous film which coat surfaces of the electrode active material particles, an anode comprising a carbon-based active material, and an electrolytic solution, and the electrolytic solution does not substantially comprise additives for stabilizing a coat formed on the surface of the anode, the cathode is excellent in terms of wettability with respect to electrolytic solutions, and, consequently, it is possible to suppress capacity deterioration caused by charging and discharging cycles without adding additives which may increase the resistance of electrolytic solutions and provide lithium-ion secondary batteries having a high output.

DETAILED DESCRIPTION OF THE INVENTION

An embodiment of a lithium-ion secondary battery of the present invention will be described.

Meanwhile, the present embodiment is specific description for better understanding of the gist of the invention and does not limit the present invention unless particularly otherwise described.

Lithium-Ion Secondary Battery

A lithium-ion secondary battery of the present embodiment comprises a cathode comprising an electrode material, the electrode material comprising electrode active material particles, and an oxide coat and a carbonaceous film which coat surfaces of the electrode active material particles; an anode comprising a carbon-based active material; and an electrolytic solution; and the electrolytic solution does not substantially include additives for stabilizing a coat formed on the surface of the anode.

Cathode

The cathode in the present embodiment comprises an electrode material comprising electrode active material particles, and an oxide coat and a carbonaceous film which coat the surfaces of the electrode active material particles. In more detail, the cathode in the present embodiment comprises a current collector made of a metal foil and an electrode mixture layer formed on the current collector, and the electrode mixture layer comprises the electrode material in the present embodiment. That is, the cathode in the present embodiment is obtained by forming an electrode mixture layer on one main surface of the current collector using the electrode material in the present embodiment.

Electrode Material

The electrode material in the present embodiment comprises electrode active material particles, and an oxide coat and a carbonaceous film which coat the surfaces of the electrode active material particles as described above.

Electrode Active Material Particles

Examples of an electrode active material constituting the electrode active material particles in the present embodiment include lithium cobaltate, lithiumnickelate, lithiummanganate, lithium titanate, and $Li_xA_yD_zPO_4$ (here, A represents at least one selected from the group consisting of Co, Mn, Ni, Fe, Cu, and Cr, D represents at least one selected from the group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z \leq 1.5$).

The electrode active material particles preferably comprise at least one selected from the group consisting of lithium cobaltate, lithium nickelate, lithium manganate, lithium titanate, and $Li_xA_yD_zPO_4$ as a main component.

Here, the main component refers to a component having a content in the total mass of the electrode active material particles of more than 50% by mass.

Here, A in $Li_xA_yD_zPO_4$ is preferably Co, Mn, Ni, or Fe since it is easy to obtain a high discharge potential.

D in $Li_xA_yD_zPO_4$ is preferably Mg, Ca, Sr, Ba, Ti, Zn, or Al since it is easy to obtain a high discharge potential.

In addition, the rare earth elements in $Li_xA_yD_zPO_4$ refer to the 15 elements of La, Ce, Pr, Nd, Pm, Sm, Eu, Gd, Tb, Dy, Ho, Er, Tm, Yb, and Lu which belong to the lanthanum series.

Among them, the electrode active material is preferably $Li_xFe_yD_zPO_4$ (A in $Li_xA_yD_zPO_4$ is Fe), more preferably $Li_xFe_yPO_4$ (in $Li_xA_yD_zPO_4$, A is Fe, and z=0), and still more preferably $LiFePO_4$ (in $Li_xA_yD_zPO_4$, A is Fe, x=1, y=1, and z=0).

As the compound represented by $Li_xA_yD_zPO_4$, it is possible to use a compound manufactured using a method of the related art such as a solid phase method, a liquid phase method, or a gas phase method. Examples of $Li_xA_yD_zPO_4$ obtained using the above-described method include particulate $Li_xA_yD_zPO_4$ (hereinafter, in some cases, referred to as "$Li_xA_yD_zPO_4$ particles").

$Li_xA_yD_zPO_4$ particles can be obtained by, for example, hydrothermally synthesizing a slurry-form mixture obtained by mixing a Li source, an A source, a P source, water, and, if necessary, a D source. According to the hydrothermal synthesis, $Li_xA_yD_zPO_4$ is generated in water in a precipitate form. The obtained precipitate may be a precursor of $Li_xA_yD_zPO_4$. In this case, target $Li_xA_yD_zPO_4$ particles can be obtained by calcinating the precursor of $Li_xA_yD_zPO_4$.

In the hydrothermal synthesis, a pressure-resistant airtight container is preferably used.

Here, examples of the Li source include lithium salts such as lithiumacetate ($LiCH_3COO$) and lithiumchloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, sulfates, and the like which include at least one selected from the group consisting of Co, Mn, Ni, Fe, Cu, and Cr. For example, in a case in which A in $Li_xA_yD_zPO_4$ is Fe, examples of a Fe source include divalent iron salts such as iron (II) chloride ($FeCl_2$), iron (II) acetate ($Fe(CH_3COO)_2$), and iron (II) sulfate ($FeSO_4$). Among these, as the Fe source, at least one selected from the group consisting of iron (II) chloride, iron (II) acetate, and iron (II) sulfate is preferably used.

Examples of the D source include chlorides, carboxylates, sulfates, and the like which include at least one selected from the group consisting of Mg, Ca, S, Sr, Ba, Ti, Zn, B, Al, Ga, In, Si, Ge, Sc, Y, and rare earth elements.

Examples of the P source include phosphoric acid compounds such as phosphoric acid ($H_3PO_4$), ammonium dihydrogen phosphate ($NH_4H_2PO_4$), and diammonium phosphate (($NH_4$)$_2HPO_4$). Among these, as the P source, at least one selected from the group consisting of phosphoric acid, ammonium dihydrogen phosphate, and diammonium hydrogen phosphate is preferably used.

The $Li_xA_yD_zPO_4$ particles may be crystalline particles or amorphous particles. In addition, the $Li_xA_yD_zPO_4$ particles may be mixed crystal particles in which crystalline particles and amorphous particles coexist. The $Li_xA_yD_zPO_4$ particles may be amorphous particles since, when thermally treated in a non-oxidative atmosphere at 500° C. to 1000° C., the amorphous $Li_xA_yD_zPO_4$ particles crystallize. This thermal treatment temperature is a temperature at which a carbonaceous film and an oxide coat which will be described below are formed.

The size of the electrode active material particle is not particularly limited, and the average particle diameter of the primary particles is preferably 10 nm or more and 20,000 nm or less and more preferably 20 nm or more and 5,000 nm or less.

When the average particle diameter of the primary particles of the electrode active material particles is 10 nm or more, it is possible to sufficiently coat the surfaces of the primary particles with the carbonaceous film, a decrease in the discharge capacity at a high charge-discharge rate is suppressed, and it is possible to realize sufficient charge and discharge rate performance. In addition, when the average particle diameter of the primary particles of the electrode active material particles is 20,000 nm or less, the internal resistance of the primary particles does not easily become high, and the discharge capacity at a high charge-discharge rate is not easily deteriorated.

In the present embodiment, the average particle diameter of the primary particles of the electrode active material particles refers to the particle diameter D50 at which the cumulative volume percentage reaches 50% in the particle size distribution.

The average particle diameter of the primary particles of the electrode active material particles can be measured by measuring dispersed electrode active material particles using a dynamic light scattering nano-particle size analyzer LB-550 (device name) manufactured by Horiba, Ltd. or by observing and counting dispersed electrode active material particles using an electronic microscope.

The shape of the electrode active material particle is not particularly limited, but is preferably spherical and more preferably truly spherical.

When the electrode active material particles have a spherical shape, it is possible to reduce the amount of the solvent when paste for cathodes is prepared using the electrode material in the present embodiment, and it also becomes easy to apply the paste for cathodes to current collectors. The paste for cathodes can be prepared by, for example, mixing the electrode material in the present embodiment, a binder resin (binding agent), and a solvent.

In addition, when the electrode active material particles have a spherical shape, the surface area of the electrode active material particles is minimized, it is possible to minimize the amount of the binder resin blended into the electrode material, and it is possible to decrease the internal resistance of the cathode to be obtained.

Furthermore, when the electrode active material particles have a spherical shape, the electrode active material particles are easily closely packed, and thus the amount of the electrode material loaded per unit volume increases, and it is possible to increase the electrode density of the cathode. As a result, it is possible to increase the capacity of the lithium-ion secondary battery.

Oxide Coat

In the electrode material in the present embodiment, an oxide coat is formed on the surfaces of the electrode active material particles.

The oxide coat is disposed on the surfaces of the electrode active material particles. In addition, the oxide coat needs to be disposed on the surfaces of the electrode active material particles so that air gaps are generated among the electrode active material particles and thus the wettability of the electrolytic solution with respect to the electrode active material particles can be sufficiently ensured.

The oxide coat preferably has no adverse influences on the lithium ion conductivity of the electrode active material particles and preferably has different properties from the electrode active material particles in order to suppress the sintering or grain growth of the electrode active material particles.

From this point of view, the oxide coat in the present embodiment preferably comprises at least one selected from the group consisting of: $Al_2O_3$, $ZrO_2$, $SiO_2$, and $TiO_2$.

The oxide coat is preferably disposed uniformly on all of the surfaces of the electrode active material particles and more preferably disposed uniformly on both all of the surfaces of the electrode active material particles and the carbonaceous film.

The oxide coat and the carbonaceous film may be disposed so that both are partially superimposed (laminated) on each other or one coat is fully superimposed (laminated) on the other coat on the surfaces of the electrode active material particles.

In the electrode material in the present embodiment, the content of the oxide coat is preferably 0.1 parts by mass or more and 2 parts by mass or less, more preferably 0.1 parts by mass or more and 1 part by mass or less, and still more preferably 0.3 parts by mass or more and 0.6 parts by mass or less with respect to 100 parts by mass of the electrode active material particles.

When the content of the oxide coat is 0.1 parts by mass or more, it becomes easy to ensure air gaps among the electrode active material particles. On the other hand, when the content of the oxide coat is 2 parts by mass or less, lithium ion conductivity is not easily impaired.

Meanwhile, the content of the oxide coat with respect to 100 parts by mass of the electrode active material particles in the electrode material can be approximated using the amount of an oxide, which is obtained by thermally treating a precursor of the oxide coat, blended into 100 parts by mass of the electrode active material particles when the electrode material is manufactured.

Carbonaceous Film

In the electrode material in the present embodiment, a carbonaceous film is formed on the surfaces of the electrode active material particles.

The carbonaceous film is preferably disposed uniformly on all of the surfaces of the electrode active material particles and, in order to improve the wettability of the electrolytic solution with respect to the electrode active material particles and suppress the sintering and grain growth of the electrode active material particles, more preferably disposed uniformly on both all of the surfaces of the electrode active material particles and the oxide coat.

The carbonaceous film can be obtained by carbonizing an organic compound which serves as a raw material of the carbonaceous film. The detail of the organic compound which serves as the raw material of the carbonaceous film will be described below.

In the electrode material in the present embodiment, the content of the carbonaceous film is preferably 0.5 parts by mass or more and 10 parts by mass or less and more preferably 0.7 parts by mass or more and 3 parts by mass or less with respect to 100 parts by mass of the electrode active material particles.

When the content of the carbonaceous film is 0.5 parts by mass or more, it becomes easy to ensure air gaps among the electrode active material particles. On the other hand, when the content of the carbonaceous film is 10 parts by mass or less, lithium ion conductivity is not easily impaired.

In the electrode material in the present embodiment, since the oxide coat and the carbonaceous film are formed on the surfaces of the electrode active material particles, air gaps are easily generated among the electrode active material particles even when these carbonaceous film electrode active material particles agglomerate together. As a result, when the electrode material in the present embodiment is brought into contact with the electrolytic solution, it becomes easy for the electrolytic solution to travel to the surfaces of the carbonaceous film electrode active material particles, and the wettability of the electrolytic solution with respect to the electrode material further improves.

In the electrode material in the present embodiment, since the surfaces of the electrode active material particles are uniformly coated with the oxide coat and the carbonaceous film, the wettability of the electrolytic solution is excellent. In addition, in the electrode material in the present embodiment, since the surfaces of the electrode active material particles are uniformly coated with the oxide coat and the carbonaceous film, it is possible to suppress the dissolution of impurities in the cathode in the electrolytic solution and the breaking down of SEI films formed on the surface of the anode comprising the carbon-based active material and realize cathodes having a low resistance, a high output, and high durability. The reason for what has been described above is not clear, but is assumed as described below.

Electrode active material particles are likely to agglomerate in processes for manufacturing electrode materials. When agglomerated electrode active material particles are coated with the carbonaceous film, there are cases in which surfaces of the electrode active material particles which are not coated with the carbonaceous film are exposed when the agglomerated electrode active material particles are released from each other. Therefore, surfaces of the electrode active material particles on which lithium ions are easily conducted and surfaces of the electrode active material particles on which lithium ions are not easily conducted coexist, and surfaces having low electron conductivity are generated. In addition, the wettability of the carbonaceous film with respect to the electrolytic solution is not sufficient. Therefore, particularly in high-density electrodes, it is not possible to sufficiently wet the carbonaceous film with the electrolytic solution, and the reaction area decreases. As a result, the output characteristics of the electrode material become uneven.

In contrast, in the electrode material in the present embodiment, since the carbonaceous film comprising the fine oxide coat is disposed on the surfaces of the electrode active material particles, it becomes easy for the electrolytic solution to flow into among the carbonaceous film electrode active material particles. That is, in the electrode material in the present embodiment, on the surfaces of the electrode active material particles, islands formed of the fine oxide coat are present in the sea formed of the carbonaceous film. Therefore, it is considered that it becomes easy for the carbonaceous film electrode active material particles and the electrolytic solution to come into contact with each other, the reaction area between the carbonaceous film electrode active material particles and the electrolytic solution also increases, and the electrode material in the present embodiment is excellent in terms of wettability with respect to the electrolytic solution.

In the related art, when the wettability between the electrode material and the electrolytic solution improves, it becomes easy to dissolve impurities in the electrode comprising the electrode material using the electrolytic solution, and thus there are cases in which the durability of electrodes degrades. However, in the electrode material in the present embodiment, since the surfaces of the electrode active material particles are coated with the oxide coat and the carbonaceous film, it is possible to suppress the dissolution of impurities in the cathode in the electrolytic solution and the breaking down of SEI films formed on the surface of the anode comprising the carbon-based active material and realize cathodes having high durability.

Anode

The anode in the present embodiment comprises a carbon-based active material.

The carbon-based active material is not particularly limited, and examples thereof include carbon-based active materials that are generally used in lithium-ion secondary batteries.

Electrolytic Solution

The electrolytic solution in the present embodiment is not particularly limited, and examples thereof include electrolytic solutions that are generally used in lithium-ion secondary batteries. Examples of the electrolytic solution include electrolytic solutions obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 $mol/dm^3$.

The electrolytic solution in the present embodiment does not substantially comprise additives for stabilizing the coats formed on the surface of the anode.

Examples of the additives for stabilizing the coats formed on the surface of the anode include vinylene carbonate, ethylene sulfide (ES), fluoroethylene carbonate (FEC), and the like.

The fact that the electrolytic solution in the present embodiment does not substantially include the additives means that the content of the additives in the electrolytic solution is 0.1% by mass or less (below the detectable limit).

Separator

In the lithium-ion secondary battery of the present embodiment, for example, the cathode and the anode are disposed through a separator.

Examples of the separator include porous polypropylene and the like.

Since the lithium-ion secondary battery of the present embodiment comprises the cathode comprising the electrode material, the electrode material comprising the electrode active material particles, and the oxide coat and the carbonaceous film which coat the surfaces of the electrode active material particles; the anode comprising the carbon-based active material; and the electrolytic solution; and the electrolytic solution does not substantially comprise additives that form a coat formed on the surface of the anode; the cathode is excellent in terms of wettability with respect to the electrolytic solution, and consequently, the lithium-ion secondary battery suppresses capacity deterioration caused by charging and discharging cycles without adding additives which may increase the resistance of electrolytic solutions, and has a high output.

In the lithium-ion secondary battery of the present embodiment, the internal resistance of the cathode can be decreased by producing the cathode using the electrode material in the present embodiment. Furthermore, it is possible to suppress the breaking down and rebuilding of SEI films that are generated on the surface of the anode comprising the carbon-based active material, and thus it becomes possible to realize sufficient durability even in a state in which the amount of additives for stabilizing coats that are formed on the surface of the anode is decreased or additives are not added. Therefore, the resistance of the electrolytic solution can be decreased, and it becomes possible to decrease the internal resistance of the lithium-ion secondary battery. As a result, it is possible to provide lithium-ion secondary batteries which can achieve high durability and be charged and discharged at a high rate without significantly decreasing the voltage.

Meanwhile, in the lithium-ion secondary battery of the present embodiment, since the cathode comprising the electrode material in which the surfaces of the electrode active material particles are uniformly coated with the oxide coat and the carbonaceous film is provided, lithium ions are easily intercalated into or deintercalated from the cathode, and the cathode is excellent in terms of wettability with respect to the electrolytic solution, and thus the area of the cathode relating to the intercalation and deintercalation of lithium ions increases. As a result, the cathode and the lithium-ion secondary battery are considered to have excellent output characteristics.

Method for Manufacturing Electrode Material

The electrode material in the present embodiment can be manufactured using an arbitrary method in which the above-described constitution can be obtained. However, since the electrode material in the present embodiment comprises the above-described preferred aspect, the electrode material is preferably manufactured using a method for manufacturing the electrode material described below.

A method for manufacturing the electrode material in the present embodiment has a slurry preparation step of preparing a slurry by mixing at least one electrode active material particle raw material selected from the group consisting of electrode active material particles and precursors of the electrode active material particles, an oxide coat precursor, an organic compound which is a carbonaceous film precursor, and water together and a calcination step of drying the slurry and calcinating the obtained dried substance in a non-oxidative atmosphere.

Slurry Preparation Step

In the slurry preparation step, since the oxide coat precursor and the organic compound which is a carbonaceous film precursor are interposed among the electrode active material particles and are uniformly mixed together, the surfaces of the electrode active material particles can be evenly coated with the oxide coat precursor and the organic compound.

Furthermore, in the calcination step, the organic compound that coats the surfaces of the electrode active material particles carbonizes, and the oxide coat precursor which coats the surfaces of the electrode active material particles changes to an oxide coat, thereby obtaining an electrode material comprising the electrode active material particles uniformly coated with the oxide coat and the carbonaceous film.

Examples of the electrode active material particles that are used in the method for manufacturing the electrode material in the present embodiment include electrode active materials constituting the electrode material in the present embodiment described above. In addition, examples of the precursor of the electrode active material particles that are used in the method for manufacturing the electrode material in the present embodiment include precursors (a Li source, an A source, a P source, a D source, and the like) of electrode active material particles constituting the electrode material in the present embodiment described above.

Examples of the oxide coat precursor that is used in the method for manufacturing the electrode material in the present embodiment include salts, alkoxides, colloid particles, and the like which include a component of the oxide coat constituting the electrode material in the present embodiment described above. Examples of the oxide coat precursor include aluminum acetate, aluminum sulfate, aluminum butoxide, aluminum acetylacetonate, alumina sol, zirconia sol, zirconium oxyacetate, zirconium ammonium carbonate, colloidal silica, tetraethyl orthosilicate, titania sol, titanium tetraisopropoxide, titanium chloride, and the like.

The organic compound that is used in the method for manufacturing the electrode material in the present embodiment is not particularly limited as long as the compound is capable of forming a carbonaceous film on the surfaces of the electrode active material particles. Examples of the organic compound include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols such as propylene glycol and ethylene glycol, trivalent alcohols such as glycerin, and the like.

Regarding the blending ratio between the electrode active material particle raw material and the oxide coat precursor, when the total mass of the oxide coat precursor is converted to the amount of an oxide, the amount of the oxide is preferably 0.1 parts by mass or more and 5 parts by mass or less and more preferably 0.3 parts by mass or more and 2 parts by mass or less with respect to 100 parts by mass of the electrode active material particle raw material.

Here, when the blending ratio of the oxide coat precursor in terms of the amount of the oxide is 0.1 parts by mass or more, favorable wettability with respect to the electrolytic solution is ensured, and breaking down of SEI films can be prevented. When the blending ratio of the oxide coat precursor in terms of the amount of the oxide is 5 parts by mass or less, it is possible to suppress the capacity being excessively decreased due to a decrease in the mass ratio of the electrode active material.

When the total mass of the organic compound is converted to a carbon element, the amount of the organic compound blended into the electrode active material particle raw material is preferably 0.6 parts by mass or more and 4.0 parts by mass or less and more preferably 1.1 parts by mass or more and 1.7 parts by mass or less with respect to 100 parts by mass of the electrode active material particle raw material.

When the blending amount of the organic compound in terms of a carbon element is 0.6 parts by mass or more, in a case in which a lithium-ion secondary battery comprising a cathode comprising the electrode material in the present embodiment is produced, the discharge capacity at a high charge-discharge rate does not easily become low, and it is possible to realize sufficient charge and discharge rate performance. On the other hand, when the blending amount of the organic compound in terms of a carbon element is 4.0 parts by mass or less, the steric hindrance is small when lithium ions diffuse in the carbonaceous film, and the lithium ion migration resistance becomes small. As a result, in a case in which a lithium-ion secondary battery comprising a cathode comprising the electrode material in the present embodiment is produced, the internal resistance of the lithium-ion secondary battery does not easily increase, and it is possible to suppress the voltage drop at a high charge-discharge rate.

In the slurry preparation step, the electrode active material particle raw material, the oxide coat precursor, and the organic compound are dissolved or dispersed in water, thereby preparing a homogeneous slurry.

When these raw materials are dissolved or dispersed in water, it is also possible to add a dispersant.

The method for dissolving or dispersing the electrode active material particle raw material, the oxide coat precursor, and the organic compound in water is not particularly limited as long as the electrode active material particle raw material is dispersed in water, and the oxide coat precursor, and the organic compound are dissolved or dispersed in water. The above-described method is preferably a method in which a medium stirring-type dispersing apparatus that stirs medium particles at a high speed such as a planetary ball mill, an oscillation ball mill, a bead mill, a paint shaker, or an attritor is used.

When the electrode active material particle raw material, the oxide coat precursor, and the organic compound are dissolved or dispersed in water, it is preferable to disperse the electrode active material particle raw material in water in a primary particle form, then, add the oxide coat precursor and the organic compound to water, and stir the oxide coat precursor and the organic compound so as to be dissolved or dispersed. In such a case, the surfaces of the primary particles of the electrode active material particle raw material are easily coated with the organic compound. Therefore, the oxide coat precursor and the organic compound are uniformly dispersed on the surfaces of the primary particles of the electrode active material particle raw material, and consequently, the surfaces of the primary particles of the electrode active material particles are coated with the carbonaceous film derived from the organic compound and the oxide coat.

When the slurry is prepared, the conditions for dispersing the slurry, for example, the concentrations of the electrode active material particle raw material, the oxide coat precursor, and the organic compound in the slurry, the stirring duration, and the like are appropriately adjusted so that the ratio (D90/D10) of the particle diameter (D90) at which the cumulative volume percentage is 90% in the particle size distribution of the secondary particles of the electrode active material particle raw material to the particle diameter (D10) at which the cumulative volume percentage is 10% in the particle size distribution of the secondary particles of the electrode active material particle raw material falls in a range of 5 to 30. In such a case, it is possible to set the volume density of an agglomerate comprising the electrode active material particle raw material, the oxide coat precursor, and the organic compound which have been obtained in a range of 50% by volume to 80% by volume of the volume density of the solid agglomerate.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower and more preferably 600° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidization of the dried substance, a reducing atmosphere including approximately several percentages by volume of a reducing gas such as hydrogen ($H_2$) is preferred. In addition, for the purpose of removing organic components evaporated in the non-oxidative atmosphere during calcination, a susceptible or burnable gas such as oxygen ($O_2$) may be introduced into the non-oxidative atmosphere.

Here, when the calcination temperature is set to 500° C. or higher, it is easy for the organic compound in the dried substance to be sufficiently decomposed and reacted, and the organic compound is easily and sufficiently carbonized. As a result, it is easy to prevent the generation of a decomposed substance of the high-resistance organic compound in the obtained agglomerate. When the calcination temperature is set to 1,000° C. or lower, lithium (Li) in the electrode active material particle raw material is not easily evaporated, and the electrode active material particles being grown to be equal to or larger than the target size is suppressed. As a result, in a case in which a lithium-ion secondary battery comprising a cathode comprising the electrode material in the present embodiment is produced, it is possible to prevent the discharge capacity at a high charge-discharge rate from becoming low, and it is possible to realize a lithium-ion secondary battery having sufficient charge and discharge rate performance.

In this calcination step, the conditions for calcinating the dried substance, for example, the rate of temperature rise, the maximum holding temperature, and the holding duration are appropriately adjusted, whereby it is possible to control the particle size distribution of the obtained agglomerate.

By means of the above-described steps, the surfaces of the primary particles of the electrode active material particles are coated with carbon generated by the thermal decomposition of the organic compound in the dried substance.

Method for Manufacturing Cathode

The method for manufacturing the cathode in the present embodiment is not particularly limited as long as an electrode mixture layer can be formed on one main surface of a current collector using the electrode material in the present embodiment. Examples of the method for manufacturing the cathode in the present embodiment include the following method.

First, the electrode material in the present embodiment, a binding agent made of a binder resin, and a solvent are mixed together, thereby preparing paint for electrode formation or paste for electrode formation. At this time, to the paint for electrode formation or paste for electrode formation in the present embodiment, a conductive auxiliary agent such as carbon black may be added if necessary.

As the binding agent, that is, the binder resin, for example, a polytetrafluoroethylene (PTFE) resin, a polyvinylidene fluoride (PVdF) resin, fluorine rubber, or the like is preferably used.

The blending ratio between the electrode material in the present embodiment and the binding agent is not particularly limited, and, for example, the amount of the binding agent blended is preferably 1 part by mass or more and 30 parts by mass or less and more preferably 3 parts by mass or more and 20 parts by mass or less with respect to 100 parts by mass of the electrode material.

Here, the reason for setting the blending ratio between the electrode material and the binding agent in the above-described range is that, when the blending ratio of the binding agent is less than 1 part by mass, in a case in which the electrode mixture layer is formed using the paint for electrode formation or the paste for electrode formation which includes the electrode material in the present embodiment, the binding property between the electrode mixture layer and the current collector is not sufficient, and there are cases in which the electrode mixture layer is cracked or dropped during the formation of the electrode mixture layer by means of rolling, which is not preferable. In addition, the electrode mixture layer is peeled off from the current collector in a step of charging and discharging the battery, and there are cases in which the battery capacity or the charge-discharge rate decreases, which is not preferable. On the other hand, when the blending ratio of the binding agent is more than 30 parts by mass, the internal resistance of the electrode mixture layer formed using the paint for electrode formation or the paste for electrode formation which includes the electrode material in the present embodiment increases, and there are cases in which the battery capacity at a high charge-discharge rate decreases, which is not preferable.

The conductive auxiliary agent is not particularly limited, and at least one selected from the group consisting of fibrous carbon such as acetylene black (AB), KETJEN BLACK, furnace black, vapor-grown carbon fiber (VGCF), and carbon nanotube is used.

A solvent that is used for the paint for electrode formation and the paste for electrode formation is appropriately selected depending on the properties of the binder resin. Examples of the above-described solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetamide, and N-methyl-2-pyrrolidone (NMP), glycols such as ethylene glycol, diethylene glycol, and propylene glycol, and the like. These solvents may be used singly, or a mixture of two or more solvents may be used.

The content ratio of the solvent in the paint for electrode formation and the paste for electrode formation is preferably 30% by mass or more and 80% by mass or less and more preferably 40% by mass or more and 70% by mass or less in a case in which the total mass of the electrode material in the present embodiment, the binding agent, and the solvent is set to 100 parts by mass.

When the solvent is included in the above-described range, the formability of the electrode mixture layer is excellent, and it is possible to obtain paint for electrode formation or paste for electrode formation having excellent battery characteristics.

The method for mixing the electrode material in the present embodiment, the binding agent, the solvent, and, if necessary, the conductive auxiliary agent together is not particularly limited as long as these components can be uniformly mixed together, and examples thereof include methods in which a kneader such as a ball mill, a sand mill, a planetary (sun-and-planet) mixer, a paint shaker, or a homogenizer is used.

Next, the paint for electrode formation or the paste for electrode formation is applied to one main surface of the current collector so as to produce a coated film, and then the coated film is dried, thereby obtaining a current collector in which a coated film made up of the above-described mixture of the electrode material and the binding agent is formed on the one main surface.

Next, the coated film is pressed by pressure and dried, thereby producing a cathode having the electrode mixture layer on one main surface of the current collector.

Method for Manufacturing Lithium-Ion Secondary Battery

Apiece having a predetermined shape (for example, a disc shape) is obtained from the cathode obtained as described above by means of punching and is vacuum-dried.

After that, the cathode having the predetermined shape, an anode, an electrolytic solution, and a stainless steel (SUS) cell (for example, a 2016 coil-type cell) are used in an atmosphere filled with an inert gas such as dried nitrogen ($N_2$) or argon (Ar), thereby producing a lithium-ion secondary battery.

EXAMPLES

Hereinafter, the present invention will be specifically described using examples and comparative examples, but is not limited to the following examples.

Example 1

Production of Electrode Material

Lithium acetate ($LiCH_3COO$) (4 mol), iron (II) sulfate ($FeSO_4$) (2 mol), and phosphoric acid ($H_3PO_4$) (2 mol) were mixed with water (2 L) so that the total amount reached 4 L, thereby preparing a homogeneous slurry-form mixture.

Next, this mixture was stored in a pressure-resistant airtight container having a capacity of 8 L and was hydrothermally synthesized at 200° C. for one hour, thereby generating a precipitate.

Next, the precipitate was washed with water, thereby obtaining a cake-form precursor of an electrode active material.

Next, an aqueous solution of a polyvinyl alcohol obtained by dissolving a zirconia sol (product name: NANOUSE ZR, manufactured by Nissan Chemical Industries, Ltd.) (1.5 g in terms of an oxide) as an oxide precursor and a polyvinyl alcohol (PVA) (5.4 g) as an organic compound in water (100 g) was mixed with the precursor of the electrode active material (150 g in terms of the solid content) so as to produce a slurry, and a dispersion treatment was carried out on this slurry using a two-fluid wet-type jet crusher so that D50 in the particle size distribution of the precursor particles of the electrode active material in the slurry reached 100 nm.

Next, the slurry on which the dispersion treatment had been carried out was sprayed and dried in the atmosphere at 180° C., thereby obtaining a dried substance having an average particle diameter of 12 μm.

Next, the obtained dried substance was calcinated at 700° C. in a nitrogen atmosphere for one hour, thereby obtaining an electrode material (A1) of Example 1 which has an average particle diameter of 12 μm.

Production of Electrode

The obtained electrode material (A1), polyvinylidene fluoride (PVdF) as a binding agent, and acetylene black (AB) as a conductive auxiliary agent were mixed together so that the mass ratio (among the electrode material 1:PVdF: AB) reached 90:5:5, and furthermore, fluidity was imparted by adding N-methyl-2-pyrrolidone (NMP) as a solvent, thereby preparing paste for electrode formation.

Next, the paste for electrode formation was applied onto one main surface of a 15 μm-thick aluminum (A1) foil so as to forma coated film, and the coated film was dried, thereby forming an electrode mixture layer on one main surface of the aluminum foil. After that, the electrode mixture layer was pressed at a pressure of 60 MPa so as to obtain a predetermined density, thereby producing a cathode (A1) of Example 1.

Production of Lithium-Ion Secondary Battery

Next, a natural graphite anode plate (graphite:PVdF: AB=94:3:3) was disposed as an anode so as to face the cathode 1, and furthermore, a separator made of porous polypropylene was disposed between the cathode (A1) and the anode, thereby producing a battery member (A1). The theoretical capacity ratio between the cathode and the anode was set to 1:1.1.

In addition, ethylene carbonate and diethyl carbonate were mixed together so that the mass ratio therebetween reached 1:1, and furthermore, 1 mol/L of a $LiPF_6$ solution was added thereto, thereby preparing an electrolytic solution (A1) having lithium ion conductivity.

Next, the battery member (A1) was immersed in the electrolytic solution (A1), thereby producing a lithium-ion secondary battery (A1) of Example 1.

Example 2

An electrode material (A2) of Example 2 was obtained in the same manner as in Example 1 except for the fact that the zirconia sol was changed to ammonium zirconium oxycarbonate (3.2 g in terms of an oxide).

A cathode (A2) of Example 2 was produced in the same manner as in Example 1 using this electrode material (A2).

Furthermore, a lithium-ion secondary battery (A2) of Example 2 was produced in the same manner as in Example 1 using this cathode (A2).

Example 3

An electrode material (A3) of Example 3 was obtained in the same manner as in Example 1 except for the fact that the zirconia sol was changed to an alumina sol (manufactured by Nissan Chemical Industries, Ltd.) (1.13 g in terms of an oxide).

A cathode (A3) of Example 3 was produced in the same manner as in Example 1 using this electrode material (A3).

Furthermore, a lithium-ion secondary battery (A3) of Example 3 was produced in the same manner as in Example 1 using this cathode (A3).

Example 4

An electrode material (A4) of Example 4 was obtained in the same manner as in Example 1 except for the fact that the zirconia sol was changed to titanium tetraisopropoxide (5.3 g in terms of an oxide) to which the equivalent (substance amount ratio of 1:1) of acetylacetone was added as a stabilizer, and the aqueous solution of the polyvinyl alcohol was changed to an aqueous solution of sucrose obtained by dissolving sucrose (8.2 g) in water (100 g).

A cathode (A4) of Example 4 was produced in the same manner as in Example 1 using this electrode material (A4).

Furthermore, a lithium-ion secondary battery (A4) of Example 4 was produced in the same manner as in Example 1 using this cathode (A4).

Example 5

An electrode material (A5) of Example 5 was obtained in the same manner as in Example 1 except for the fact that the zirconia sol was changed to a silica sol (manufactured by Nissan Chemical Industries, Ltd.) (3 g in terms of an oxide).

A cathode (A5) of Example 5 was produced in the same manner as in Example 1 using this electrode material (A5).

Furthermore, a lithium-ion secondary battery (A5) of Example 5 was produced in the same manner as in Example 1 using this cathode (A5).

Example 6

An electrode material (A6) of Example 6 was obtained in the same manner as in Example 1 except for the fact that the aqueous solution of the polyvinyl alcohol was changed to an aqueous solution of glucose obtained by dissolving glucose (13 g) in water (100 g).

A cathode (A6) of Example 6 was produced in the same manner as in Example 1 using this electrode material (A6).

Furthermore, a lithium-ion secondary battery (A6) of Example 6 was produced in the same manner as in Example 1 using this cathode (A6).

Example 7

Production of electrode material Lithium acetate ($LiCH_3COO$) (4 mol), iron (II) sulfate ($FeSO_4$) (0.4 mol), manganese (II) sulfate ($MnSO_4$) (1.6 mol), and phosphoric acid ($H_3PO_4$) (2 mol) were mixed with water (2 L) so that the total amount reached 4 L, thereby preparing a homogeneous slurry-form mixture.

Then, an electrode material (A7) of Example 7 in which the molar ratio (Fe/Mn) between Fe and Mn was 2/8 was obtained in the same manner as in Example 1.

Production of Electrode and Lithium-Ion Secondary Battery

An electrode material (A7) of Example 7 was obtained in the same manner as in Example 1 except for the fact that the aqueous solution of the polyvinyl alcohol was changed to an aqueous solution of glucose obtained by dissolving glucose (13 g) in water (100 g).

A cathode (A7) of Example 7 was produced in the same manner as in Example 1 using this electrode material (A7).

Furthermore, a lithium-ion secondary battery (A7) of Example 7 was produced in the same manner as in Example 1 using this cathode (A7).

Example 8

Production of Electrode Material

Lithium acetate ($LiCH_3COO$) (4 mol), iron (II) sulfate ($FeSO_4$) (0.6 mol), cobalt (II) sulfate ($CoSO_4$) (1.4 mol), and phosphoric acid ($H_3PO_4$) (2 mol) were mixed with water (2 L) so that the total amount reached 4 L, thereby preparing a homogeneous slurry-form mixture.

Then, an electrode material (A8) of Example 8 in which the molar ratio (Fe/Co) between Fe and Co was 3/7 was obtained in the same manner as in Example 7.

Production of electrode and lithium-ion secondary battery
A cathode (A8) of Example 8 was produced in the same manner as in Example 1 using this electrode material (A8).

Furthermore, a lithium-ion secondary battery (A8) of Example 8 was produced in the same manner as in Example 1 using this cathode (A8).

Comparative Example 1

An electrode material (B1) of Comparative Example 1 was obtained in the same manner as in Example 1 except for the fact that the zirconia sol was not used.

A cathode (B1) of Comparative Example 1 was produced in the same manner as in Example 1 using this electrode material (B1).

Furthermore, a lithium-ion secondary battery (B1) of Comparative Example 1 was produced in the same manner as in Example 1 using this cathode (B1).

Comparative Example 2

An electrolytic solution (B2) of Comparative Example 2 was prepared in the same manner as in Example 1 except for the fact that vinylene carbonate (2% by mass) was added thereto as an additive.

A lithium-ion secondary battery (B2) of Comparative Example 2 was produced in the same manner as in Comparative Example 1 using this electrolytic solution (B2).

Comparative Example 3

A lithium-ion secondary battery (B3) of Comparative Example 3 was produced in the same manner as in Example 1 except for the fact that the electrolytic solution (A1) was changed to the electrolytic solution (B2).

Evaluation of Electrode Materials

For the electrode materials (A1) to (A8) produced in Examples 1 to 8 and the electrode material (B1) produced in Comparative Example 1, the amounts of carbon and the amounts of the oxide in the carbonaceous film were measured using the following evaluation methods. The results are shown in Table 1.

(1) Measurement of Amount of Carbon

The amounts of carbon (% by mass) in the electrode materials were measured using a carbon analyzer (device name: carbon/sulfur analyzer EMIA-810W, manufactured by Horiba Ltd.).

(2) Measurement of Amount of Oxide in Carbonaceous Film

With an assumption that metallic elements or silicon constituting the oxide precursor which had been added during the production of the electrode materials all turned into an oxide, the amounts of an oxide were estimated, and the amounts of the oxide in the carbonaceous film were computed.

Evaluation of Lithium-Ion Secondary Batteries

For the lithium-ion secondary batteries (A1) to (A8) produced in Examples 1 to 8 and the lithium-ion secondary batteries (B1) to (B3) produced in Comparative Examples 1 to 3, the 5 C discharge capacities (mAh/g), the charge internal resistances (Ω), the discharge internal resistance (Ω), and the capacity retention (%) after 1,000 cycles were measured using the following evaluation methods, and the results are shown in Table 2.

For the respective lithium-ion secondary batteries, charging and discharging was carried out at a charge-discharge rate of 5 C, and the 5 C discharge capacity was measured. Meanwhile, for Examples 1 to 6 and Comparative Examples 1 to 3, the voltage ranges were set in a range of 2 V to 4.2 V, for Example 7, the voltage range was set in a range of 2 V to 4.5 V, and, for Example 8, the voltage range was set in a range of 2 V to 4.9 V.

In addition, after the states of charge of the respective lithium-ion secondary batteries were adjusted to be 50%, the lithium-ion secondary batteries were charged and discharged for ten seconds at currents corresponding to 1 C, 3 C, 5 C, and 10 C, and I-V lines (current-voltage lines) were obtained from voltages and currents flowing after ten seconds. The charge internal resistances and the discharge internal resistances of the lithium-ion secondary batteries were obtained from the slopes of the obtained I-V lines. Between charging and discharging, a downtime of ten minutes was provided. Meanwhile, the charge internal resistances and the discharge internal resistances of the respective lithium-ion secondary batteries which are shown in Table 2 are relative values obtained in a case in which the charge internal resistance and the discharge internal resistance of the lithium-ion secondary battery (B2) of Comparative Example 2 were set to 100.

In addition, repeated charging and discharging tests (cycle tests) were carried out on the respective lithium-ion secondary batteries at 60° C., a charging current of 2 C, and a discharging current of 2 C, thereby evaluating the capacity retention (durability) after 1,000 cycles.

TABLE 1

| | Electrode material | Amount of carbon [% by mass] | Amount of oxide [% by mass] | Amount of oxide in carbonaceous film [% by mass] |
|---|---|---|---|---|
| Example 1 | A1 | 1.1 | 1 | 48 |
| Example 2 | A2 | 1.0 | 1 | 50 |
| Example 3 | A3 | 1.2 | 0.75 | 38 |
| Example 4 | A4 | 2.2 | 2 | 48 |
| Example 5 | A5 | 1.1 | 1 | 48 |
| Example 6 | A6 | 3.1 | 1 | 24 |
| Example 7 | A7 | 3.1 | 1 | 24 |
| Example 8 | A8 | 3.0 | 1 | 25 |
| Comparative Example 1 | B1 | 1.1 | — | — |

TABLE 2

| | Lithium-ion secondary battery | 5 C discharge capacity [mAh/g] | Charge internal resistance [Ω] | Discharge internal resistance [Ω] | Capacity retention after 1,000 cycles [%] |
|---|---|---|---|---|---|
| Example 1 | A1 | 124 | 84 | 95 | 85 |
| Example 2 | A2 | 126 | 83 | 92 | 88 |
| Example 3 | A3 | 122 | 83 | 92 | 86 |
| Example 4 | A4 | 118 | 84 | 93 | 88 |
| Example 5 | A5 | 116 | 86 | 96 | 75 |
| Example 6 | A6 | 120 | 86 | 96 | 75 |
| Example 7 | A7 | 116 | 88 | 95 | 84 |
| Example 8 | A8 | 115 | 90 | 94 | 82 |
| Comparative Example 1 | B1 | 115 | 88 | 97 | 55 |
| Comparative Example 2 | B2 | 109 | 100 | 100 | 75 |
| Comparative Example 3 | B3 | 120 | 92 | 99 | 88 |

From the results in Table 2, it was found that the lithium-ion secondary batteries (A1) to (A8) of Examples 1 to 8 had high discharge capacities and low charge internal resistances and low discharge internal resistances. In addition, it was found that the lithium-ion secondary batteries (A1) to (A8) of Examples 1 to 8 had high capacity retention after 1,000 cycles and excellent durability.

On the other hand, it was found that the lithium-ion secondary battery (B1) of Comparative Example 1 had a high discharge capacity and had a low charge internal resistance and a low discharge internal resistance, but had a low capacity retention after 1,000 cycles and poor durability. This is considered to be because the lithium-ion secondary battery (B1) of Comparative Example 1 did not include the oxide coat that coated the surfaces of the electrode active material particles.

The lithium-ion secondary battery (B2) of Comparative Example 2 was found to have a high charge internal resistance and a high discharge internal resistance and thus have a low discharge capacity. This is considered to be because, in the lithium-ion secondary battery (B2) of Comparative Example 2, the resistance of the electrolytic solution (B2) including vinylene carbonate was high.

The lithium-ion secondary battery (B3) of Comparative Example 3 was found to have a high discharge capacity, but have a high charge internal resistance and a high discharge internal resistance. This is considered to be because, in the lithium-ion secondary battery (B3) of Comparative Example 3, the resistance of the electrolytic solution (B2) including vinylene carbonate was high.

The present invention can be applied to lithium-ion secondary batteries comprising a cathode made of an electrode comprising an electrode material that is used as a cathode material for lithium-ion secondary batteries.

What is claimed is:

1. A lithium-ion secondary battery comprising:
a cathode comprising an electrode material, the electrode material comprising
electrode active material particles represented by a formula:

$$Li_xA_yD_zPO_4$$

in which A represents at least one selected from the group consisting of Co, Mn, Ni, Fe, Cu, and Cr, D represents at least one selected from the group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$, and
a combination of an oxide coat and a carbonaceous film, which coats surfaces of the electrode active material particles so that islands formed of the oxide coat are present in a sea formed of the carbonaceous film on the surfaces of the electrode active material particle; an anode comprising a carbon-based active material; and an electrolytic solution;
and wherein the electrolytic solution comprises 0.1% by mass or less of additives for stabilizing a coating formed on a surface of the anode.

2. The lithium-ion secondary battery according to claim 1, wherein the oxide coat comprises at least one selected from the group consisting of: $Al_2O_3$, $ZrO_2$, $SiO_2$, and $TiO_2$.

3. The lithium-ion secondary battery according to claim 1, wherein a content of the oxide coat is 0.1 parts by mass or more and 2 parts by mass or less with respect to 100 parts by mass of the electrode active material particles in the electrode material.

4. The lithium-ion secondary battery according to claim 1, wherein the electrode active material particles are $LiFePO_4$ particles.

5. The lithium-ion secondary battery according to claim 1, wherein the additive is vinylene carbonate.

6. The lithium-ion secondary battery according to claim 1, wherein the oxide coat is preferably 0.1 parts by mass or more and 2 parts by mass or less with respect to 100 parts by mass of the electrode active material particles.

7. The lithium-ion secondary battery according to claim 1, wherein the carbonaceous film is disposed uniformly on all of the surfaces of the electrode active material particles.

8. The lithium-ion secondary battery according to claim 1, wherein the carbonaceous film is preferably 0.5 parts by mass or more and 10 parts by mass or less with respect to 100 parts by mass of the electrode active material particles.

9. The lithium-ion secondary battery according to claim 1, wherein the amount of oxide in the carbonaceous film 25% to 50% by mass.

10. The lithium-ion secondary battery according to claim 1, wherein the lithium-ion secondary battery has a discharge capacity between 115 and 126 mAh/g.

11. The lithium-ion secondary battery according to claim 1, wherein
the electrode material is formed by the method comprising:
preparing a slurry by mixing
at least one electrode active material particle raw material selected from the group consisting of electrode active material particles and precursors of the electrode active material particles,
an oxide coat precursor,
a carbonaceous film precursor, and
water together,
drying the slurry, and
calcinating the obtained dried slurry.

12. The lithium-ion secondary battery according to claim 11, wherein the calcinating step is performed such that the slurry is sprayed and dried in the atmosphere of 70° C. or higher and 250° C. or lower, and then the obtained dried substance is calcinated in a non-oxidative atmosphere at a temperature in a range of 500 to 1,000° C.

13. The lithium-ion secondary battery according to claim 1, wherein the electrode material is a sprayed and calcined material.

* * * * *